United States Patent [19]

Healey

[11] Patent Number: 4,650,238

[45] Date of Patent: Mar. 17, 1987

[54] ROOF FOR GOLF CART

[76] Inventor: Gordon Healey, 3800 Amherst, Port Arthur, Tex. 77642

[21] Appl. No.: 822,745

[22] Filed: Jan. 27, 1986

[51] Int. Cl.⁴ .............................................. B60R 9/04
[52] U.S. Cl. .................................... 296/37.7; 224/311; 280/DIG. 5
[58] Field of Search ............................ 296/37.70, 37.1; 224/311, 274; 150/52 G; 280/DIG. 5

[56] References Cited

U.S. PATENT DOCUMENTS

| | | | |
|---|---|---|---|
| 2,963,314 | 12/1960 | Richardson | 296/37.7 |
| 3,525,572 | 8/1970 | Hall | 224/311 |
| 4,332,415 | 6/1982 | Williams | 280/DIG. 5 |

Primary Examiner—Robert R. Song
Attorney, Agent, or Firm—Anastassios Triantaphyllis

[57] ABSTRACT

A golf cart top roof for stowing golf clubs and other golf accessories is disclosed. The roof structure includes four walls forming a compartment therebetween that houses two sets of tubular members. Each set is adapted to receive a set of golf clubs and other accessories needed by a golf player.

8 Claims, 5 Drawing Figures

ROOF FOR GOLF CART

TECHNICAL FIELD

This invention relates to golf equipment, and more particularly, to a stowage compartment for golf clubs and other golf accessories. Still more particularly, the present invention relates to a roof structure for golf carts that has a stowage compartment for stowing golf clubs and other golf accessories.

BACKGROUND OF THE INVENTION

The game of golf is a very popular game that is played throughout the world by people of all ages and athletic abilities. While playing the game of golf, the golf player has to cover a great distance from the teeing point to the last hole. Furthermore, the golf player has to carry several golf clubs, each club being suitable for a specific purpose. A golf player, for example, would use one club for distance, another club for accuracy, etc. A full set of golf clubs includes four wood clubs, nine iron clubs and one putter. Furthermore, a golf player would occasionally carry a ball retriever, and other accessories, such as an umbrella, etc.

Presently, the golf clubs and other golf accessories are carried in golf bags that are especially made for that purpose. Furthermore, although many players choose to walk the entire distance and to carry the heavy golf bag either on their shoulders or in a push cart, other players utilize well-known motorized golf carts that provide seats for two people and a golf bag carriage section in the back thereof. The golf carts have roofing structures that are suitable for providing the passengers of the golf carts with some protection from the rain or the sun.

U.S. Pat. Nos. 4,098,536 and 4,332,415 disclose golf carts having seats, sections for carrying golf bags and roofing structures.

The use of golf club bags and the placement of those bags in the back of golf carts in order to carry the golf clubs on the golf course has many disadvantages. One disadvantage is that it requires the use of a golf bag in addition to the use of a golf cart, thereby increasing the number of equipment required to play a game of golf. Another disadvantage is that the placing of the golf bag in the back of the golf cart in an upright position, as described in the aforementioned patents, makes the removal or replacement of the golf clubs in the bag difficult and inconvenient. Another disadvantage is that the bag has an open top, whereby the golf clubs are exposed to the elements of nature such as the sun and the rain. Another disadvantage is that oftentimes there are more than one golf bags placed in the rear section of the cart whereby the golf cart becomes crowded. Another disadvantage is that the clubs are usually placed in the bag in a disorderly fashion, thereby making the location of the appropriate club a difficult task.

The present invention overcomes all the aforementioned disadvantages by providing a stowage compartment for the golf clubs that is an integral part of the golf cart thereby eliminating the need for bags and the "overcrowding" of the cart; by providing a stowage compartment that is easily accessible to the players; by providing a stowage compartment in which the golf clubs are arranged in an orderly fashion; by protecting the golf clubs and other accessories from the elements of nature; and by providing a stowage compartment that is very economical.

These and other objects and advantages of the invention will appear from the following description.

SUMMARY OF THE INVENTION

Accordingly, the present invention discloses a golf cart roof that has a stowage compartment for stowing golf clubs and other golf accessories in an orderly fashion. In accordance with the preferred embodiment of the present invention, the roof has four walls forming a stowage compartment therebetween, and openings on both ends of the stowage compartment that are closed by swingable doors. Plates on both ends of the stowage compartment support a plurality of tubular members extending from the plate to the interior of the compartment, each tubular member being adapted to receive the shaft of a golf club. A typical roof provides a stowage compartment for two sets of golf clubs, the stowage of the first set being accessible through one opening of the compartment and the stowage of the other set being accessible through the other opening of the compartment.

BRIEF DESCRIPTION OF THE DRAWINGS

For detailed description of the invention, reference will be made to the accompanying drawings, wherein.

DESCRIPTION OF THE PREFERRED EMBODIMENT

Figure 1:
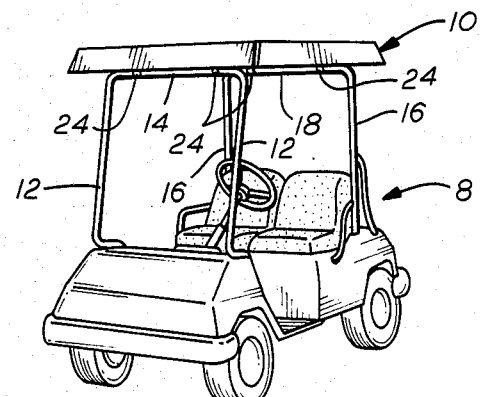
FIG. 1 is a perspective view of a golf cart having a roof in accordance with the present invention.

Referring now to FIG. 1, there is shown a golf cart 8 having a roof 10, in accordance with the present invention. Roof 10 extends over a substantial portion of golf cart 8 to provide protection from the sun and the rain. Furthermore, roof 10 includes a stowage compartment, hereinafter described, for stowing golf clubs and other accessories. Roof 10 is attached and supported on golf cart 8 by two forward upright members or bars 12 that are connected at the top by a forward horizontal member or bar 14 and two rear upright members or bars 16 that are connected at the top by a horizontal member or bar 18. Roof 10 is secured to horizontal bars 14 and 18 by fastener means 24 such as nut and bolt, rivet or the like.

Figure 2:
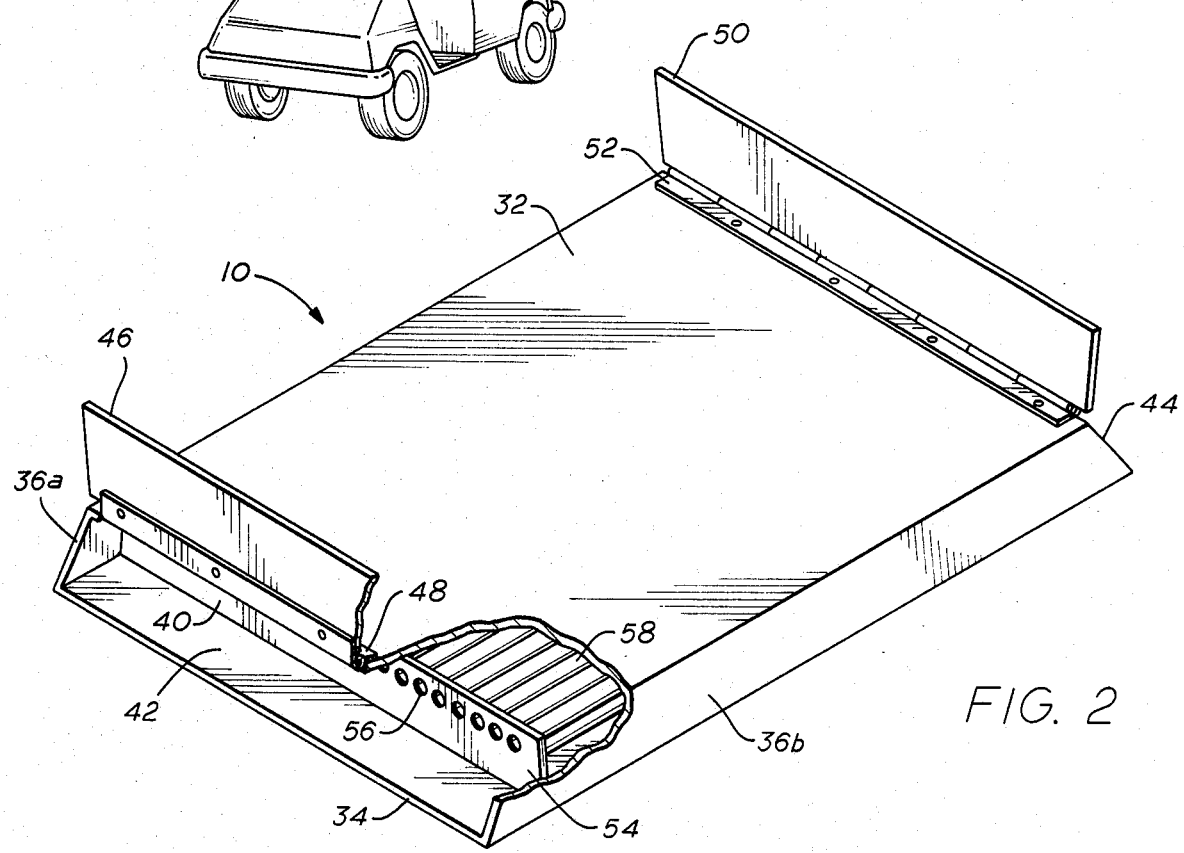
FIG. 2 is a part cross-sectional perspective view of the roof of the golf cart shown in FIG. 1.

Referring now to FIG. 2, there is shown roof 10 having a generally horizontal upper wall 32 being superimposed over a lower wall 34. Upper wall 32 and lower wall 34 are spaced apart by side walls 36a, b that are connected to the side edges of upper wall 32 and lower wall 34. Although the width of upper wall 32 is the same as the width of lower wall 34, the length of upper wall 32 is smaller than the length of lower wall 34 and lower wall 34 extends beyond upper wall 32 on both ends of roof 10. Upper wall 32, lower wall 34 and side walls 36a, b form a compartment 40 therebetween having a forward opening 42 and a rear opening 44.

A swingable door 46 is attached to the upper face of upper wall 32 via swingable connecting means such as hinges 48 for opening and closing forward opening 42. Swingable door 46 extends substantially throughout the entire width of upper wall 32 and lower wall 34 and is adapted to cover the entire forward opening 42 when door 46 is in the closing position. A rear swinging door 50 that is substantially similar to swinging door 46 is attached to the rear end of the upper wall 32 by swinging means or hinges 52 that is substantially similar to swinging means 48. Swinging door 50 is adapted to close or open rear opening 44.

A substantially vertical plate 54 is positioned adjacent forward opening 42, between upper wall 32 and lower wall 34 and throughout the entire width of compartment 40. Plate 54 includes an array of apertures 56 for receiving the golf clubs. A plurality of tubular members 58, each tubular member 58 being coaxially attached to an aperture 56, extends from plate 54 to the interior of compartment 40. The length of tubular members 58 is sufficient to allow the stowage of the entire length of a golf club or a similar apparatus. Tubular members 58 form a row of tubular members that is substantially horizontal and parallel with upper wall 32 and lower wall 34.

A plate 60 (not shown in FIG. 2) that is similar to plate 54 is located adjacent rear opening 44. Plate 60 extends in a substantially vertical fashion between upper wall 32, lower wall 34 and side walls 36a, b. Plate 60 includes an array of apertures 62 that extend horizontally through substantially the entire length of plate 60. A plurality of tubular members 64, each tubular member being coaxially aligned with an aperture 62, extend from plate 60 to the interior of compartment 40. Although the arrangement of apertures 62 and tubular members 64 is similar to the arrangement of apertures 56 and tubular members 58, apertures 56 and tubular members 58 are located above apertures 62 and tubular members 64 to prevent interference between tubular members 58 and tubular members 64. Accordingly, tubular members 64 form a row that is below the row formed by tubular members 58.

Figure 3:
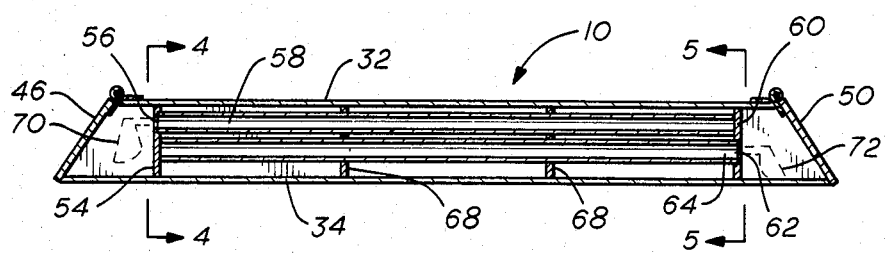
FIG. 3 is a transverse sectional view of the roof of the golf cart shown in FIG. 1.

Referring now to FIG. 3, there is shown a cross-sectional view of roof 10 having upper wall 32 and lower wall 34. Swinging doors 46 and 50 are shown in the closed position. Tubular members 58 that are coaxial with apertures 62 extend from plate 54 to the interior of compartment 40 and tubular members 64 extend from plate 60 to the interior of compartment 40. The row of tubular members that is formed by the tubular members 64 is below the row formed by tubular members 58. Tubular members 58 and 64 are supported in the interior of compartment 40 by support means 68. Golf clubs 70 and 72 are shown being stowed in tubular members 58 and 64, respectively.

Figure 4:
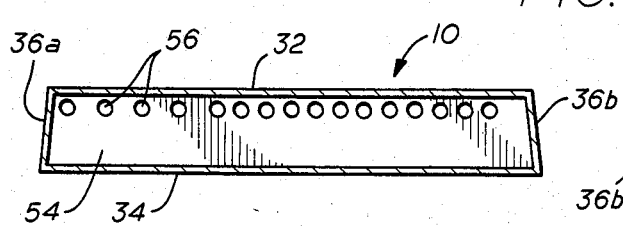
FIG. 4 is a cross-sectional view of the roof of the golf cart shown in FIG. 1 taken on line 4—4 of FIG. 3.

FIG. 4 is a cross-sectional view of roof 10 along line 4—4 of FIG. 3. Referring to FIG. 4, there is shown apertures 56 and plate 54 that extends between upper wall 32, lower wall 34 and side walls 36a, b. In this particular embodiment, there is shown sixteen apertures that are sufficient to accommodate the standard fourteen clubs that are present in a golf club set, a ball retriever and an umbrella.

Figure 5:
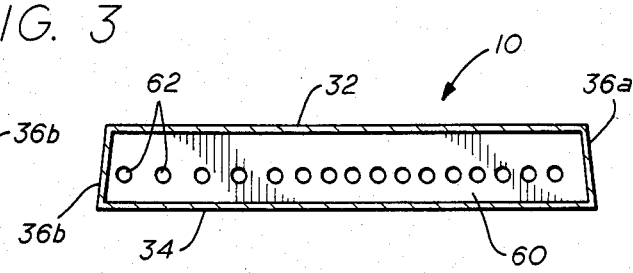
FIG. 5 is a cross-sectional view of the roof of the golf cart shown in FIG. 1 taken on line 5—5 of FIG. 3.

FIG. 5 is a cross-sectional view of roof 10 along line 5—5 of FIG. 3 showing apertures 62 in plate 60. Plate 60 extends between upper wall 32, lower wall 34 and side walls 36a, b. The arrangement of apertures 62 is substantially similar to the arrangement of apertures 56 except for the fact that apertures 62 are at a lower level than apertures 56 to prevent interference between tubing elements 58 and tubing elements 64. Similarly to apertures 56, apertures 62 are adapted to receive fourteen golf clubs that are present in a golf club set, a ball retriever and an umbrella.

The arrangement described hereinabove will accommodate the stowage of two sets of golf clubs. This arrangement would satisfy the need of a typical twosome venturing out on the golf course for a golf game in golf cart 8. It should be understood, however, that the present invention could be modified to accommodate the stowage of one or more than two sets of golf clubs and to accommodate the stowage of other golfing equipment. This could be accomplished by increasing or decreasing the number of apertures in a row, or by increasing or decreasing the number of rows of tubing members in compartment 40.

The golf cart roof disclosed by the present invention is typically constructed from fiberglass, plastic, wood, metal, or similar material depending on the economics, individual preference and other factors that are not material to the novelty of this invention.

While a preferred embodiment of the present invention has been shown and described, modifications thereof can be made by one skilled in the art without departing from the spirit of the invention. For example, it should be understood that the present invention is not limited to providing stowage for two sets of golf clubs, but that it may be used for providing storage for three or more sets or on the alternative, for just one set. Furthermore, it should be understood that the present invention is not limited to the arrangement of the tubing members described hereinabove, but that the tubes may be arranged in any other fashion that could provide the required stowage. Furthermore, it should be understood that the plate and tubing member arrangement disclosed herein may be omitted altogether and that a hollow compartment could be used for the stowing of golf clubs and/or other accessories and golfing equipment.

What is claimed is:

1. A roof for a golf cart for stowing golf clubs, comprising:
a roof structure having an upper wall, a lower wall and two side walls, the upper, lower and side walls forming a stowage compartment therebetween, the stowage compartment having a forward opening;
a first plate having a plurality of first apertures for receiving golf clubs, the plate being connected to the roof structure;
a first door attached to the upper wall by first swinging means for opening and closing the forward opening; and
means for connecting the roof structure to the golf cart.

2. A roof according to claim 1 further including a plurality of first tubes being coaxial with the first apertures.

3. A roof according to claim 2 further including:
a second plate having a plurality of second apertures for receiving golf clubs; and
a plurality of second tubes being coaxial with the first apertures.

4. A golf cart roof, comprising;
a roof body having first and second stowage compartments, the first stowage compartment having a first compartment opening and a plurality of first tubes for receiving the golf clubs and the second stowage compartment having a second compartment opening and a plurality of second tubes for receiving the golf clubs.

5. A golf cart roof according to claim 4 wherein the first and second tubes are securely attached to the roof body.

6. A golf cart roof according to claim 4 wherein the first tubes are parallel to each other in a generally horizontal configuration.

7. A golf cart roof according to claim 4 wherein the first tubes include sixteen tubes.

8. A golf cart roof according to claim 4 further including means for closing the first stowage compartment.

* * * * *